J. F. ROWLETT.
Adjustable Stove-Pipe.

No. 205,908.        Patented July 9, 1878.

Witnesses
Fred. G. Dieterich
Geo. Binkenburg

Inventor
Joseph F. Rowlett.

N. PETERS, PHOTO-LITHOGRAPHER, WASHINGTON, D C.

UNITED STATES PATENT OFFICE.

JOSEPH F. ROWLETT, OF RICHMOND, INDIANA.

IMPROVEMENT IN ADJUSTABLE STOVE-PIPES.

Specification forming part of Letters Patent No. 205,908, dated July 9, 1878; application filed June 10, 1878.

*To all whom it may concern:*

Be it known that I, JOSEPH F. ROWLETT, of Richmond, in the county of Wayne and State of Indiana, have invented certain new and useful Improvements in Adjustable Stove-Pipes; and I do hereby declare the following to be a full, clear, and exact description of the same, reference being made to the accompanying drawing, forming a part of this specification, and in which—

Figure 1:
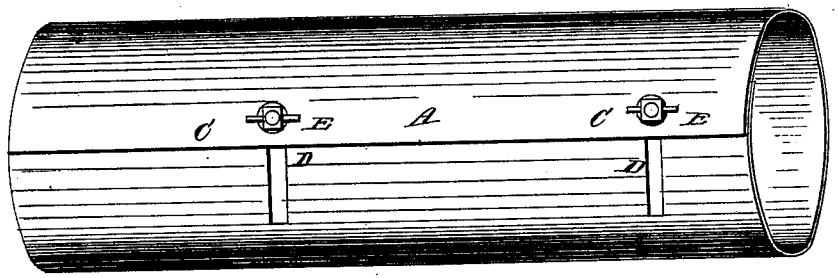
Figure 2:
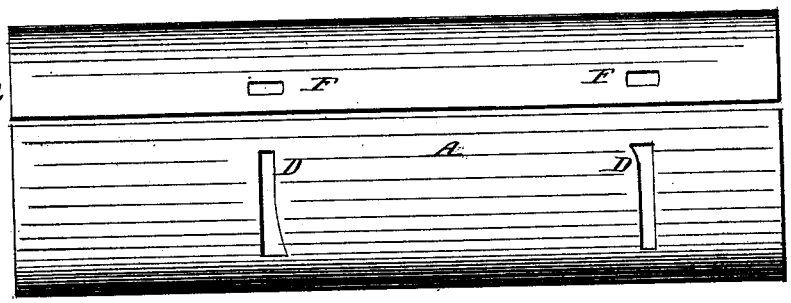
Figure 3:
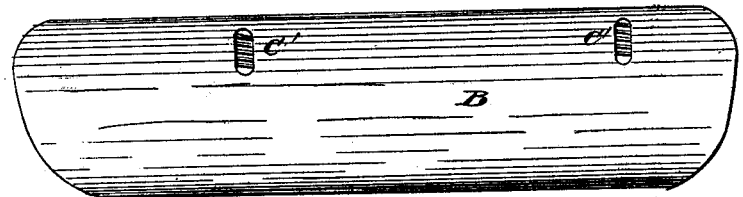
Figure 4:
Figure 5:
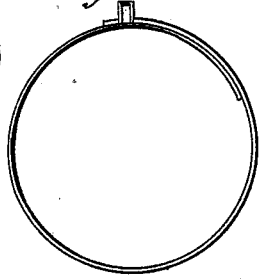
Figure 6:
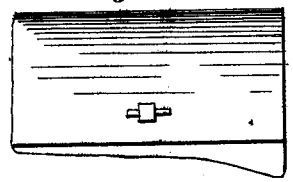

Figure 1 is a top or plan view of my adjustable stove-pipe. Fig. 2 is a similar view with the adjusting-bolts or fastening devices removed, for exhibiting the slots for lateral or vertical adjustment. Fig. 3 is a plan view of a lining or plate which may be used and placed on the inside of the pipe to cover the slots therein, and to which the adjusting-bolts may be attached. Figs. 4, 5, and 6 are modifications, showing how loops and keys may be used for fastening devices in place of bolts and nuts.

This invention relates to improvements in the class of adjustable stove-pipes in which the pipe may be made larger or smaller, as desired, to facilitate the fitting of the pipe in the flue, and also forming the tapering or lower point; and to this end the invention consists of an overlapping stove-pipe having a novel construction of slots, through which the fastening devices pass, for insuring a more perfect adjustment of the pipe, as will be hereinafter fully described.

In the drawing, A represents the pipe, and B an inside lining therefor to cover the slots in the pipe when adjusted, and to which the bolts C may be secured.

The pipe is provided with transverse slots D D, enlarged at one end and slightly curved at one edge, as shown in Fig. 2, for the purpose of allowing the bolts free play when it is necessary to adjust either end of the pipe to make it larger than the other. The pipe is also provided with longitudinal slots F F, for the same purpose, in its opposite edge, for allowing free play on the bolts in adjusting under all circumstances.

The lining B may be entirely dispensed with, and loops and keys used for fastening devices, as clearly shown in Figs. 4, 5, and 6, the loop being fastened to one edge of the pipe, and passing through the transverse slots, and receiving keys on the outside of the pipe. The most preferable and economical construction is to give the pipe sufficient lap to cover the transverse slots when the pipe is distended, and attach screw-bolts rigidly to the edge of the pipe, and allow them to pass through the transverse slots and receive a thumb-nut on the outside.

The pipe may, if desired, be telescoped to any desired point for vertical adjustment, thus avoiding the necessity of using short pieces or joints, so common in applying stove-pipes in connection with stoves to flues of different heights.

The adjustable pipe may, with equal facility, be adjusted larger at one end than the other, to connect pipes of different diameters, thus avoiding the necessity of having joints made with one end larger than the other; and it may also be easily fitted to any sized hole in a flue or chimney, it only being necessary to loosen the thumb-nuts, one or both, as the case may require, and press the pipe in or out, as may be required to make the necessary adjustment, and tighten the nuts, which completes the operation.

The slots F F may be simply holes; but slots are preferable; neither, however, being necessary when the lining B is dispensed with, as the bolts or loops would, in such instance, be rigidly attached to the edge of the pipe itself instead, and pass through the transverse slots only.

This adjustable metal pipe may, with equal facility, be adapted to conductors for water, or elevators for grain, or any like purpose.

I am aware that an overlapping and slotted stove-pipe, in combination with an internal plate, and bolts for securing the pipe in position after adjustment and covering the slots in the pipe, is old, and such I do not desire to claim, broadly, as my invention; but

I claim as my invention—

1. An overlapping stove-pipe provided with transverse slots enlarged at one end and curved, as shown, in combination with fastening devices, substantially as herein shown and described.

2. An overlapping stove-pipe provided with transverse enlarged and curved slots D D and slots or holes F F, in combination with an inside lining and fastening devices, substantially as herein shown and described.

JOSEPH F. ROWLETT.

Witnesses:
F. B. HUNT,
JOEL STOVER.